United States Patent [19]
Baugher et al.

[11] 3,736,469
[45] May 29, 1973

[54] SWITCHING REGULATOR OVERLOAD PROTECTION CIRCUIT

[75] Inventors: Dale Milton Baugher, Flemington, N.J.; Kenneth Walter Awkward, Hauppauge, N.Y.

[73] Assignee: RCA Corporation, New York, N.Y.

[22] Filed: Feb. 14, 1972

[21] Appl. No.: 226,076

[52] U.S. Cl. .................. 317/22, 317/33 VR, 323/9
[51] Int. Cl. ............................................. H02h 3/08
[58] Field of Search .......................... 317/22, 33 VR; 323/9

[56] References Cited
UNITED STATES PATENTS

| | | | |
|---|---|---|---|
| 3,182,246 | 5/1965 | Lloyd | 317/33 VR |
| 3,405,319 | 10/1968 | Barringer | 317/33 VR |
| 3,109,980 | 11/1963 | Wiley | 317/33 VR |
| 3,131,344 | 4/1964 | Rosenfeld et al. | 317/33 VR |
| 3,366,871 | 1/1968 | Connor | 317/33 VR |
| 3,473,106 | 10/1969 | Grabl | 317/33 VR |

Primary Examiner—James D. Trammell
Attorney—Edward J. Norton and Joseph S. Tripoli

[57] ABSTRACT

An overload protection circuit for a voltage regulator of the type having a series pass element connected between a source of unregulated voltage and a load. The regulator includes a feedback circuit connected between the output terminals and the series pass element for regulating the load voltage. A protection circuit is connected between one main terminal of the series pass element and the feedback circuit to sense an overcurrent through the pass element and to provide a signal which renders the pass element non-conductive.

14 Claims, 1 Drawing Figure

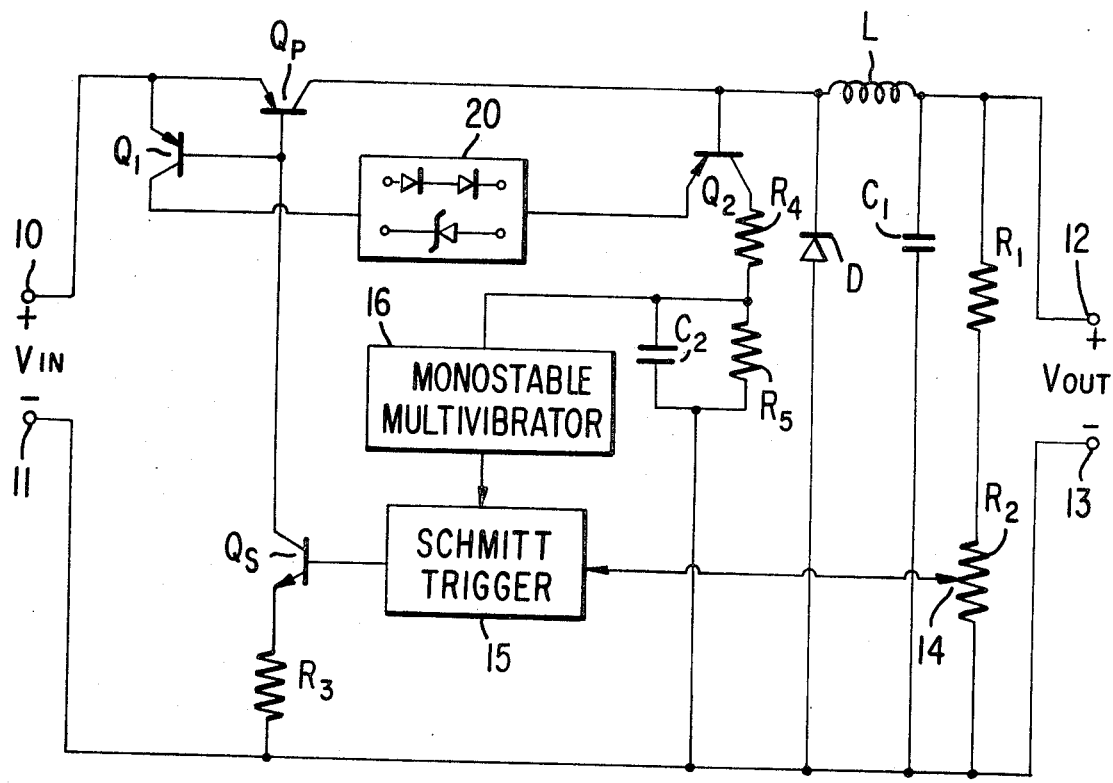

SWITCHING REGULATOR OVERLOAD PROTECTION CIRCUIT

DETAILED DESCRIPTION OF THE INVENTION

The present invention relates generally to overload protection circuits and more particularly to overload or overcurrent protection circuits for a voltage regulator.

There are many arrangements known in the regulated voltage power supply art for providing overload protection. The term "overload" is generally considered in the art to mean a condition, such as a complete or partial short circuit of the load, which causes an excessively high current to pass through the main regulating device.

One known method for providing overload protection in a series voltage regulator is the provision of a sensing resistor in a series circuit with the pass element, the load and the source of unregulated voltage. Generally, a sensing amplifier is connected in the circuit with the sensing resistor and, when the current passing through the sensing resistor reaches a certain level, the amplifier will respond to the voltage developed across the resistor. The signal from the amplifier under overload conditions is processed to either permanently or periodically shut down the pass element so as to prevent damage thereto by virtue of excessive power dissipation.

There are several drawbacks in utilizing the the sensing resistor method of overload protection. First, in order to keep the sensing circuitry simple, the voltage drop across the sensing resistor is often made equal to the base to emitter voltage of one of the transistors in the power supply. For high current operations, this represents considerable power dissipation which requires a large resistor and reduces efficiency of the power supply, particularly when the output voltage is low.

A second drawback occurs when the sensing voltage is reduced to less than the $V_{BE}$ of a transistor. In this case, a differential amplifier is often employed to sense over-current. However, the use of a differential amplifier typically requires an isolated power supply voltage, and this requirement causes the entire detection circuitry to be complex and expensive.

The present invention provides a protection circuit that does not use large power resistors, does not require isolated supplies, does not degrade efficiency, and is simple and inexpensive. In addition, it is particularly well-suited to low output voltage switching type regulators.

In accordance with the present invention there is provided a circuit having a pair of input terminals and a pair of output terminals. A transistor is provided having one main electrode connected to one input terminal and the other main electrode connected to one output terminal. Means are provided in a feedback loop from the output terminals to the control electrode of the transistor to control the conduction of current through the transistor. In addition, means are provided between the other main electrode of the transistor and the feedback loop for sensing the existence of base current into the transistor and for providing a signal to the feedback loop for rendering the transistor non-conductive when the voltage across the transistor has exceeded a certain level, thus protecting the transistor against excessive power dissipation.

The sole Figure of the drawing shows one embodiment of the invention in the context of a switching series voltage regulator.

Although the detailed description of the invention is discussed herein in terms of a series switching regulator, the inventive aspects of the present overload protection circuit will find many useful applications in other types of regulators as well as other circuits where one desires to protect a transistor from excessive flow of current.

Referring now to the sole FIGURE in the case, a source of unregulated DC voltage (not shown) provides a potential, $V_{in}$, to a pair of input terminals 10 and 11 with a positive polarity applied to terminal 10 and a negative polarity applied to terminal 11.

Input terminal 10 has a connection to the emitter electrode of transistor $Q_p$. Transistor $Q_p$ is the series pass transistor and in the embodiment shown is operated between its non-conducting state and its saturated state of conduction. The collector electrode of transistor $Q_p$ has a connection to one end of inductor L.

The other end of inductor L has a connection to one output terminal 12. The other output terminal 13 is electrically connected to input terminal 11. A load, (not shown) may be placed across the output terminals 12 and 13 where a regulated output voltage, $V_{out}$, is developed when the circuit is in operation.

A resistive voltage divider network comprising resistors $R_1$ and $R_2$ is connected across the output terminals 12 and 13. Resistors $R_1$ and $R_2$ provide an output voltage sensing network. Resistor $R_2$ is of the potentiometer type with a slider arm terminal 14. The voltage developed at the slider arm terminal 14 is related or proportional to the output voltage $V_{out}$.

The voltage developed at terminal 14 is coupled to the input terminal of a Schmitt trigger circuit 15. The output signals from the trigger circuit 15 are coupled to the base electrode of transistor $Q_s$.

The emitter electrode of transistor $Q_s$ is connected via resistor $R_3$ to the electrical connection between input terminal 11 and output terminal 13. The collector electrode of transistor $Q_s$ is connected to the base electrode of transistor $Q_p$.

In addition, a diode, D, generally called a freewheeling diode in the switching regulator art, has its cathode electrode electrically connected to the collector electrode of transistor $Q_p$ and its anode electrode electrically connected to the connection between input terminal 11 and output terminal 13. A capacitor $C_1$ is connected directly across the voltage divider resistors $R_1$ and $R_2$.

The circuit thus far described is a conventional switching regulator. The circuit is arranged such that the Schmitt trigger circuit 15 renders transistor $Q_s$ conductive when the voltage at the slider arm 14 falls below a certain level. When transistor $Q_s$ is turned on, transistor $Q_p$ is turned on, in response thereto, and transistor $Q_p$ goes to a saturated condition of operation. When transistor $Q_p$ is turned on, the output voltage $V_{out}$ increases and thus the voltage at slider arm terminal 14 increases. When the voltage at the slider arm terminal 14 increases to a certain level, proportional to the desired regulated voltage across output terminals 12 and 13, the output signal from the Schmitt trigger is removed, thus the drive on the base electrode of transistor $Q_s$ is removed and transistor $Q_p$ is in turn rendered non-conductive.

While transistor $Q_p$ is in its off state, the freewheeling diode D conducts so that the level of current in the inductor L is preserved.

It should be noted at this point that the arrangement in the Figure is only illustrative of one type of switching regulator and the invention is not limited thereto. For example, the voltage divider $R_1$, $R_2$ and Schmitt trigger could be replaced by a voltage comparator network such as a differential amplifier with a reference voltage input terminal and a voltage related to the regulated voltage applied to a second input terminal. The output signal from the differential amplifier may be made to operate an oscillator of some sort. The oscillator is generally made operable in response to variations in the output voltage. The oscillating signal generated would ultimately cause the pass transistor to be switched on periodically or to be held on for a period of time (as in a duty cycle controlled situation) until the desired regulated voltage at the output terminals is obtained.

For present purposes it will suffice to note that as in most voltage regulators, the regulator shown in the Figure includes a feedback path which comes from the output terminals 12 and 13 up to and including the base electrode of transistor $Q_p$. The operation of this feedback path in conjunction with transistor $Q_p$ provides the desired voltage regulating function.

Additional circuitry is provided as shown in the Figure, comprising a transistor $Q_1$ having its emitter electrode electrically connected to the emitter electrode of transistor $Q_p$. The base electrode of transistor $Q_1$ is electrically connected to the base electrode of transistor $Q_p$.

Another transistor, $Q_2$, has its base electrode electrically connected to the collector electrode of transistor $Q_p$ and the emitter electrode of transistor $Q_2$ is electrically connected to the collector electrode of transistor $Q_1$ through a device 20. Device 20 will be more fully described herein.

The collector electrode of transistor $Q_2$ is electrically connected to one end of resistor $R_4$. The other end of resistor $R_4$ is electrically connected to one end of a parallel RC network comprising capacitor $C_2$ and resistor $R_5$. The other end of the parallel RC network is connected to the electrical connection of input terminal 11 and output terminal 13.

The junction of resistor $R_4$ and the parallel RC network is electrically connected to the input terminal of a monostable multivibrator 16. The output signal from the multivibrator 16 is coupled to the Schmitt trigger circuit 15.

In the context of the switching regulator shown in the Figure, the theory of protection is as follows. The pass transistor $Q_p$ is being switched on and off depending upon the voltage appearing across the output terminals 12 and 13. When transistor $Q_p$ is in a non-conducting condition, i.e. with no base drive current applied thereto, substantially all of the input voltage, $V_{in}$, appears across transistor $Q_p$. When transistor $Q_p$ is rendered conductive, i.e. with base drive current applied thereto, a very low voltage, e.g. 0.7 – 1.0 volts, should appear across transistor $Q_p$ under normal operating conditions.

In general terms, the protection circuit should have a configuration such that when transistor $Q_p$ is turned on, a sensing circuit is also turned on which detects the voltage across transistor $Q_p$. If transistor $Q_p$ is on and the voltage across it is higher than the anticipated value, then an overload condition exists, such as a short circuit at the load. The regulating function should be shut down by rendering transistor $Q_p$ non-conductive.

Referring back to the embodiment shown in the Figure, the operation is as follows.

Assume a condition where no base drive is supplied to transistor $Q_s$ and hence there is no base drive supplied to transistor $Q_p$. Under these conditions a fault or overload condition cannot affect transistor $Q_p$ and therefore no fault indication signal is required. In addition, since the base electrode of transistor $Q_1$ is electrically connected to the base electrode of transistor $Q_p$, transistor $Q_1$ is also non-conductive at this time. Therefore, there is no drive applied to transistor $Q_2$ and hence no collector current passes through transistor $Q_2$ and no fault signal is generated.

Now assume normal operation where drive is applied to the base electrode of transistor $Q_s$, and hence both transistors $Q_1$ and $Q_p$ are on and at least transistor $Q_p$ is in a saturated condition of operation. In this case the voltage drop across the emitter to collector path of transistor $Q_p$ is less than the saturated collector to emitter of transistor $Q_1$ plus the base to emitter voltage of transistor $Q_2$, hence transistor $Q_2$ remains in an OFF condition. Here again there is no flow of collector current from transistor $Q_2$ and hence no fault signal generated. Here the important thing to be noted is that the voltage supplied at the emitter electrode of transistor $Q_2$ is, relative to the voltage supplied to the base electrode thereof, under the assumed conditions, insufficient to forward bias the base to emitter junction of transistor $Q_2$.

Finally, assume a fault condition such as a total or partial short circuit across the output terminals and drive is applied to the base electrode of transistor $q_s$. Drive is also applied to the base electrodes of transistors $Q_p$ and $Q_1$ and both transistors are rendered conductive. Transistor $Q_p$ will initially go to a saturated condition of operation with the current therethrough limited by the series connected inductor L. After a time interval, while the fault condition exists, the current passed through transistor $Q_p$ will increase to the point where transistor $Q_p$ comes out of its saturated condition of operation. When transistor $Q_p$ comes out of saturation, the voltage drop across transistor $Q_p$ increases beyond the saturated collector to emitter voltage of transistor $Q_1$ plus the base to emitter voltage of transistor $Q_2$ causing transistor $Q_2$ to be rendered conductive. When collector current in transistor $Q_2$ flows, a fault indication signal is developed at the junction between resistors $R_4$ and $R_5$. This fault indication signal may now be processed so as to protect the pass transistor from a potentially damaging power dissipation.

In the particular embodiment shown in the Figure, the function of resistors $R_4$ and $R_5$ and capacitor $C_2$ is to provide a small time delay during normal switching so that transients under normal conditions are not detected as faults.

The device 20, previously mentioned, provides a means by which one may vary the voltage level at which fault detection occurs. Device 20 may be one or more diodes or a zener diode connecting the collector of transistor $Q_1$ and the emitter electrode of transistor $Q_2$, as shown within the block designating device 20 in the Figure.

Device 20 is particularly useful when the pass element of the voltage regulator is a Darlington configuration rather than a single transistor such as the transistor $Q_p$ shown in the Figure. When the Darlington configuration is used, the pass voltage is normally higher than the single pass transistor configuration because it is composed of the saturated collector to emitter voltage of the driver plus the base to emitter voltage of the pass transistor.

In either the Darlington configuration or the single pass element $Q_p$ shown in the Figure, the turn on voltage level for transistor $Q_2$ is equal to the saturated collector to emitter voltage of transistor $Q_1$ plus the voltage across device 20 plus the base to emitter voltage of transistor $Q_2$.

When device 20 comprises several diodes the voltage drop across the device 20 equals the sum of the forward voltage drops of the several diodes. When device 20 comprises a zener diode then the voltage drop across device 20 equals the zener voltage.

Thus appropriate elements may be selected for inclusion in device 20 to vary the level at which the fault protection will occur in order to be consistent with the maximum voltage allowable across the pass element.

There are many different ways to process the fault signal generated in the above fashion. For example, complete shut down of the circuit is one possibility. The signal generated may be coupled to one or more locations in the feedback loop which includes the control electrode of the pass transistor $Q_p$.

Another attractive signal processing scheme, and the one shown in the embodiment, is shut down through the monostable multivibrator 16. The fault indication signal developed above activates multivibrator 16 which in turn deactivates the Schmitt trigger 15 so as to ultimately render the pass transistor $Q_p$ non-conductive through transistor $Q_s$. Multivibrator 16 provides an automatic reset capability since it will recurrently deactivate Schmitt trigger 17 until such time as the fault has been cleared. Thus, the circuit described will, in a sense, recurrently test for the fault condition after it has occurred and then automatically reset to normal operation when the fault has passed.

Here again, it should be noted that the shut down signal may be coupled to several places in the feedback path and the particular arrangement shown is illustrative of one of the several ways of so doing.

It has been found that the power consumption of the protection circuit shown in the Figure is minimal which adds to its desirability.

What is claimed is:

1. The circuit comprising:
   a pair of input terminals adapted for connection to a source of potential;
   a pair of output terminals adapted for connection to a load;
   a first transistor having a control electrode and two main electrodes, one main electrode having a connection to one input terminal, the other main electrode having a connection to one output terminal;
   feedback means connected between said pair of output terminals and the control electrode of said transistor for controlling the conduction of current through said transistor in response to the potential appearing between said output terminals;
   first means comprising a second and third transistor, each having two main electrodes and a control electrode, for providing a path connected across the main electrodes of the first transistor, said path comprising the main electrodes of the second transistor and one main electrode and the control electrode of the third transistor, said third transistor being maintained in a normally non-conducting condition;
   second means connecting the control electrodes of the first and second transistors; and
   third means connecting the other main electrode of the third transistor and said feedback means responsive to the conduction of current through the third transistor for providing a signal to said feedback means for rendering said first transistor non-conductive.

2. The circuit according to claim 1 wherein said third means comprises a monostable multivibrator.

3. A voltage regulator comprising:
   a pair of input terminals adapted for connection to a source of unregulated voltage;
   a pair of output terminals adapted for connection to a load;
   a first transistor having a control electrode and two main electrodes, one main electrode having a connection to one input terminal, the other main electrode having a connection to one output terminal;
   feedback means connected between said pair of output terminals and the control electrode of said first transistor for controlling the conduction of current through said first transistor main electrodes in response to the voltage appearing between said output terminals;
   a second transistor having a control electrode and two main electrodes, the control electrode of said second transistor having a connection to the other main electrode of said first transistor;
   means comprising the collector emitter path of at least one additional transistor and at least one bias level setting device connected between one main electrode of said second transistor and said one input terminal for maintaining the potential at said one main electrode of said second transistor at a level with respect to the potential at the control electrode of said second transistor such that said second transistor is normally non-conducting;
   said second transistor being rendered conductive upon the occurrence of a voltage above a certain value across the main electrodes of said first transistor; and
   means connected between the other main electrode of said second transistor and said feedback means, responsive to the conduction of current through said second transistor for providing a signal to said feedback means for rendering said first transistor non-conductive.

4. The voltage regulator according to claim 4 wherein said at least one bias level setting device comprises at least one diode connected in series circuit with said one main electrode of said second transistor and the collector to emitter path of said at least one additional transistor.

5. The voltage regulator according to claim 4 wherein said at least one bias level setting device comprises at least one zener diode connected in series circuit with said one main electrode of said second transistor and the collector to emitter path of said at least one additional transistor.

6. The voltage regulator according to claim 4 wherein said means connected between the other main electrode of said second transistor and said feedback means comprises:

a parallel RC circuit having one terminal connected in circuit with the other main electrode of said second transistor the other terminal of said RC circuit being connected to the other output terminal; and a monostable multivibrator responsive to the signal appearing at said one terminal of said RC circuit for providing a periodic signal to said feedback means for rendering said first transistor periodically non-conductive.

7. A series pass switching regulator comprising:

a pair of input terminals adapted for connection to a source of unregulated voltage;

a pair of output terminals adapted for connection to a load;

first, second and third transistors each having a control electrode and two main electrodes, the first main electrodes of said first and second transistor having a connection therebetween, the control electrodes of said first and second transistor having a connection therebetween, the second main electrode of said first transistor having a connection to the control electrode of said third transistor and the first main electrode of said third transistor having a connection to the second main electrode of said second transistor;

means for connecting one of said input terminals to the first main electrode of said first transistor;

means for connecting the second main electrode of said first transistor to one of said output terminals;

means for connecting the other input terminal to the other output terminal;

a feedback means connected between said pair of output terminals and said control electrode of said first transistor for controlling the conduction of current through said first transistor in response to the voltage appearing across said pair of output terminals; and means, connected between the second main electrode of said third transistor and said feedback means, adapted for preventing the conduction of current through the main electrodes of said first transistor upon the occurrence of a voltage across the main electrodes of said first transistor beyond a certain level.

8. The series pass switching regulator according to claim 7 further comprising:

a diode having the anode electrode thereof connected to said other input terminal and the cathode electrode thereof connected to the other main electrode of said first transistor;

an inductive energy storage device connected between the cathode electrode of said diode and said one output terminal; and a capacitor connected across said pair of output terminals.

9. The regulator according to claim 8 wherein said feedback means comprises:

a resistive voltage divider connected across said pair of output terminals for sensing the voltage appearing across said output terminals and for providing a control voltage related thereto;

a controllable oscillator means responsive to said control voltage for providing a switching signal; and amplifier means connected to the control electrode of said first transistor, said amplifying means being responsive to said switching signal for controlling the conduction of current through said first transistor.

10. The regulator according to claim 9 wherein said means connected between said third transistor main electrode and said feedback means includes a means coupled to said oscillator means for inhibiting said switching signal upon the occurrence of a voltage across the main electrodes of said first transistor beyond a certain level.

11. The regulator according to claim 10 wherein said included means comprises a monostable multivibrator.

12. The regulator according to claim 11 further comprising a parallel RC circuit connected in circuit with the second main electrode of said third transistor and said other output terminal.

13. The regulator according to claim 12 further comprising at least one additional diode connected between the first main electrode of the third transistor and the second main electrode of the second transistor.

14. The regulator according to claim 12 further comprising at least one zener diode connected between the first main electrode of the third transistor and the second main electrode of the second transistor.

* * * * *